US005227233A

United States Patent [19]

Itaba et al.

[11] Patent Number: 5,227,233

[45] Date of Patent: Jul. 13, 1993

[54] POLYETHYLENE LABEL AND METHOD OF PREPARATION THEREOF

[75] Inventors: Yasushi Itaba, Kawasaki; Yutaka Yoshifuji, Tokyo, both of Japan

[73] Assignee: Tonen Chemical Corporation, Tokyo, Japan

[21] Appl. No.: 773,561

[22] PCT Filed: Mar. 7, 1991

[86] PCT No.: PCT/JP91/00308

§ 371 Date: Nov. 6, 1991

§ 102(e) Date: Nov. 6, 1991

[87] PCT Pub. No.: WO91/14251

PCT Pub. Date: Sep. 19, 1991

[30] Foreign Application Priority Data

Mar. 7, 1990 [JP] Japan .................................. 2-53544
Mar. 7, 1990 [JP] Japan .................................. 2-53545
Mar. 7, 1990 [JP] Japan .................................. 2-53546

[51] Int. Cl.[5] ........................... B32B 7/12; B32B 3/18

[52] U.S. Cl. .................................... 428/354; 428/343; 428/156; 428/204; 427/208.6; 427/208.8

[58] Field of Search ............... 428/354, 343, 353, 204, 428/156; 427/208.6, 208.8, 261

[56] References Cited

U.S. PATENT DOCUMENTS 4,429,015 1/1984 Sheptok .......................... 428/203 X
4,590,020 5/1986 Itaba et al. ...................... 522/161 X
4,705,714 11/1987 Itaba et al. .......................... 428/215
4,957,974 9/1990 Ilenda et al. ...................... 525/57 X
5,075,152 12/1991 Tsukuda et al. ............... 428/209 X

OTHER PUBLICATIONS

Jap. Pat. Abst. 61-74819(A).
Jap. Pat. Abst. 63-194925(A).

*Primary Examiner*—George F. Lesmes
*Assistant Examiner*—D. R. Zirker
*Attorney, Agent, or Firm*—Kenyon & Kenyon

[57] ABSTRACT

A label comprising a polyethylene film in which the degree of crosslinking inwardly decreases across the thickness of the film and on one side of which printing is performed, and an adhesive layer further formed thereon. The label is good in clarity, is possible to perform back surface printing, can provide an integral feeling and a high-class feeling as if curved-surface printing is performed on a cylindrical container itself, is sufficient in rigidity and strength and therefore is possible to be thinly formed, is resistant to water wetting and contamination, is unnecessary to be stripped in recovering and recycling a polyethylene bottle when the label is stuck thereon, can be stuck on the bottle concurrently with blow molding of the bottle printed, and is therefore suitable for use as a label for in-molding. Degassing is carried out by forming an uneven surface on the adhesive surface, whereby the blister phenomenon can be avoided when the label is stuck on the surface of a bottle concurrently with blow molding of the bottle. When a primer layer intervenes between printing ink and the adhesive layer, the label excellent in the adhesive strength between the printing ink and the adhesive layer can be obtained.

4 Claims, 2 Drawing Sheets

POLYETHYLENE LABEL AND METHOD OF PREPARATION THEREOF

TECHNICAL FIELD

The present invention relates to a polyethylene label and a method for preparing the same, and more particularly to a polyethylene label used for the indication of contents by sticking it on containers, particularly on plastic bottles and a method for preparing the same.

BACKGROUND ART

Paper or synthetic paper on which printing is performed has previously been used as labels stuck on containers such as plastic bottles for indicating their contents.

For the labels using such paper, however, top surface printing can not but be performed because of opacity. As a result, the labels have the disadvantage that prints are stained or disappear by the spillover of the contents, or that the labels are broken thereby. There is further the problem that the labels must be formed to a thickness of more than 100 microns due to their low rigidity.

In contrast, the use of plastic labels on the plastic bottles provides the advantages that the labels are unnecessary to be stripped in recovering and recycling the bottles, and that the labels are resistant to water wetting.

If the bottles are formed of polyethylene and the labels are also formed of polyethylene, the above-described advantages can be more utilized because both of the bottles and the labels are formed of the same material.

On the other hand, blow molding is used for forming bottles. Blow molding is the method of forming a hollow article by air blowing, which comprises plasticizing a thermoplastic resin in an extruder, extruding the plasticized resin to form a parison, enclosing the parison not cooled to solidification yet in a mold, blowing air in the inside of the parison to expand it, and cooling the parison while pressing it to the inner wall of the mold.

On such blow molding, if a label is previously set in the mold and can be stuck on the surface of a bottle concurrently with blow molding, laborious labeling operations can be omitted.

However, the labels for this purpose (labels for in-molding) are stuck on the curved surfaces of the bottles, so that they are required to maintain their form as the labels, namely to have formability, and also required to be excellent in strength, clarity and rigidity.

There has been previously provided a polyethylene label comprising an oriented polyethylene film in which the degree of crosslinking inwardly decreases across the thickness of the film, printing being performed on one surface thereof and an adhesive layer being formed on the printed surface (Japanese Utility Model Application No. 63-116860/1988).

This label is good in clarity, and back surface printing can be performed thereon. The label can provide an integral feeling and a high-class feeling as if curved-surface printing is performed on a cylindrical container itself. Further, the label is sufficient in rigidity and strength, and therefore it is possible to be thinly formed. Furthermore, the label is resistant to water wetting and contamination, and unnecessary to be stripped in recovering and recycling the polyethylene bottle. Accordingly, the label is suitable for use as a label for in-molding which can be stuck on the bottle concurrently with blow molding of the bottle.

However, the intensive studies of the present inventors have revealed that a blister phenomenon is liable to take place due to the difficulty of complete degassing for a sealant for the label, when the label is stuck on the surface of the bottle concurrently with blow molding. This phenomenon is particularly remarkable when the molding is carried out by extrusion coating using low-density polyethylene.

The intensive studies of the present inventors have further revealed that the blister phenomenon is liable to take place due to the difficulty of complete degassing also for a sealant applied by the hot lacquer method of applying a hot lacquer and drying it, when the label is stuck on the surface of the bottle concurrently with blow molding.

Such a blister phenomenon seems temporarily unobserved, but sometimes becomes remarkable later due to the existence of very fine bubbles.

It is therefore a primary object of the present invention to provide a clear polyethylene label suitable for use as a label for in-molding, on which back surface printing can be performed, which can provide an integral feeling and a high-class feeling as if curved-surface printing is performed on a cylindrical container itself, prints on which do not disappear or which is not broken by the spillover of the contents, which is sufficient in rigidity and strength and therefore is possible to be thinly formed, and which is resistant to water wetting and contamination, which is unnecessary to be stripped in recovering and recycling a polyethylene bottle when the label is stuck thereon, and can be stuck on the bottle concurrently with blow molding of the bottle, as with the above label previously proposed.

Another object of the present invention is to provide a label in which the blister phenomenon does not occur when the label is stuck on the surface of a bottle concurrently with blow molding of the bottle.

A further object of the present invention is to improve the label previously proposed and to provide a polyethylene label excellent in adhesive strength between printing ink and an adhesive when the adhesive layer is formed on a printed surface thereof.

DISCLOSURE OF INVENTION

According to the present invention, there is provided a polyethylene label comprising a polyethylene film in which the degree of crosslinking inwardly decreases across the thickness of the film, printing being performed on one side of the film, and an adhesive layer having an uneven surface being formed on the printed surface or on the other surface not printed. As a preferred embodiment, the uneven surface has an emboss pattern or is produced by dot coating. A primer layer may further be formed between the printed surface and the adhesive layer.

The present invention further provide a method for preparing a polyethylene label which comprises performing printing on one surface of a polyethylene film in which the degree of crosslinking inwardly decreases across the thickness of the film, forming an adhesive layer on the printed surface or on the other surface not printed by extrusion coating, and embossing the extruded adhesive layer or extruding an adhesive on a chilling roll having a pattern to give an uneven surface to the adhesive layer; and a method for preparing a polyethylene label which comprises performing printing on one surface of a polyethylene film in which the degree of crosslinking inwardly decreases across the thickness of the film, and forming an adhesive layer on the printed surface or on the other surface not printed by extrusion coating, in which the printed surface or the other surface not printed of the film is brought into contact with a rotating dot roll having an adhesive to transfer the adhesive to the printed surface or the other surface not printed by dot coating, thereby forming the adhesive layer having an uneven surface.

An oriented polyethylene film used in the present invention in which the degree of crosslinking inwardly decreases in the thickness of the film is obtained, for example, by irradiating both the surfaces of a polyethylene stock sheet with electron beams to crosslink it in such a manner that the degree of crosslinking (which can be expressed in terms of gel fraction) inwardly decreases in the thickness thereof, and then biaxially stretching the resulting sheet or rolling the sheet, followed by stretching. The clarity of the film thus obtained is superior to that of prior-art general high density polyethylene films. On the other hand, when the label composed of the above-described specific polyethylene film on which back surface printing is performed is stuck particularly on a cylindrical bottle, the printed surface is sharply relieved due to the clarity of the polyethylene film. As a result, it has been found that there are given a integral feeling as if curved-surface printing is performed on the bottle itself through printing is performed on the polyethylene film, and also a high-class feeling.

Further, the above label is sufficient in rigidity, clarity and strength, and can be thinly formed. The label is made of polyethylene, printing is performed on the back surface thereof, and the adhesive layer is formed on the printed surface or on the other surface not printed. Hence, when a polyethylene bottle is formed, for example, by blow molding, the label is previously set in a mold for blow molding of the bottle, thereby bonding the surface of the adhesive layer to the surface of the blow-molded bottle. The label can thus be suitably used as a label for in-molding. The label has also the advantage of being unnecessary to be stripped in recovering and recycling when stuck on the polyethylene bottle because the label is formed of a material similar to that of the bottle. Furthermore, it does not happen that the printed surface falls off by water wetting or contamination, and therefore the label is resistant to water wetting and contamination. Also, water or stains can be easily swabbed from the label surface. Moreover, the label does not gather mold, so that it gives a clean feeling when used for sanitary purposes.

Furthermore, an adhesive (sealant) layer used in the present invention has an uneven surface. When the sealant layer is formed on the printed surface by extrusion coating, the uneven embossed pattern is formed on the surface of the sealant layer by embossing the extruded sealant layer or by extruding the sealant on a chilling roll having a pattern, whereby degassing is completely performed. Hence, when the label is stuck on the surface of the bottle, particularly concurrently with blow molding of the bottle, the blister phenomenon does not take place.

In addition, the printed surface or the other surface not printed of the film is brought into contact with a rotating dot roll having an adhesive to transfer the adhesive to the printed surface or the other surface not printed by dot coating, thereby forming the adhesive layer having an uneven surface. Hence, when the label is stuck on the surface of the bottle, particularly concurrently with blow molding of the bottle, the blister phenomenon does not take place.

Moreover, in the present invention, when a primer layer is formed between the printed surface and the adhesive layer, the polyethylene label excellent in adhesive strength between printing ink and the adhesive can be obtained.

BEST MODE FOR CARRYING OUT THE INVENTION

Figure 1B:
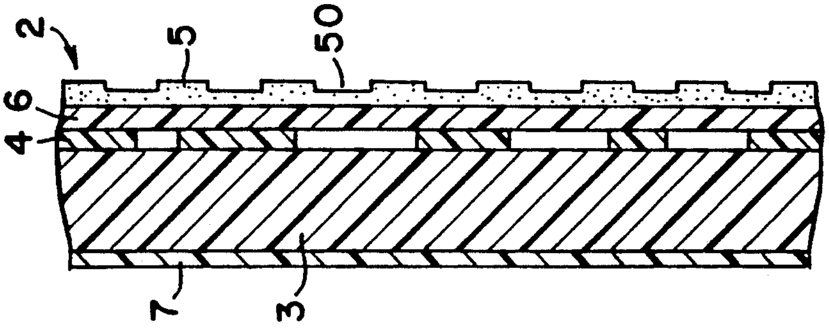
FIGS. 1A and 1B are cross sectional views showing labels embodying the present invention.

The present invention will be illustrated more particularly by reference to the following embodiments shown in the drawings.

Figure 2:
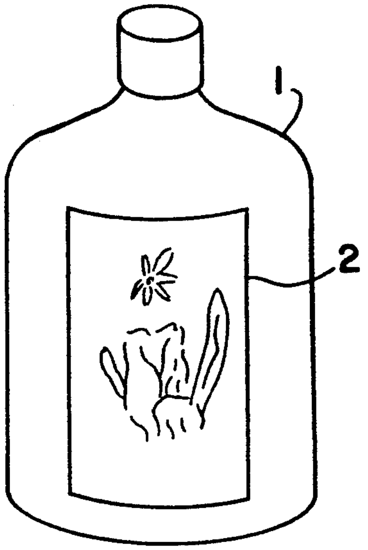
FIG. 2 is a perspective view showing a state in which a label embodying the present invention is stuck on a bottle.

A label 2 of the present invention is stuck on a plastic (polyethylene) bottle 1 as shown in FIG. 2 and used for the purpose of indicating its contents.

Figure 1A:
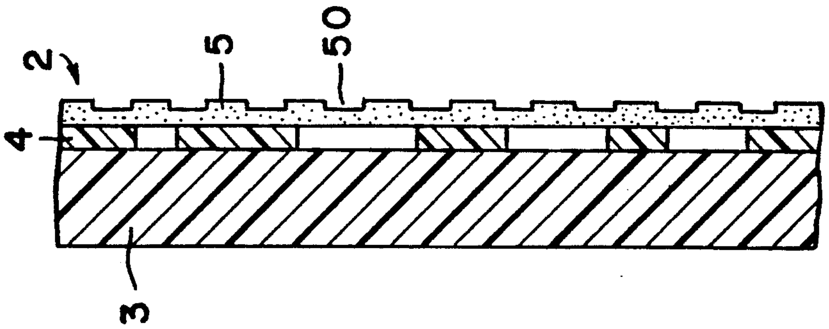

FIG. 1A is a sectional view showing an embodiment of the label53 2.

The label 2 shown in FIG. 1A comprises a oriented polyethylene film (hereinafter referred to as a BOPE film) 3 in which the degree of crosslinking inwardly decreases across the thickness of the film, a printed layer 4 being formed on one side (back surface) of the BOPE film 3, and an adhesive layer 5 formed on the printed surface.

As to the label 2 shown in FIG. 1A, the printed layer 4 is directly laminated with the adhesive layer 5 through no primer layer, and an uneven surface 50 is formed on the adhesive layer 5.

The above-described BOPE film 3 composed, for example, of polyethylene having a density of at least 0.936 g/cm$^3$ and a meld index (JIS K 6760, measured at a temperature of 190° C. and a load of 2.16 kg, hereinafter referred to as MI) of 0.5 to 20 g/10 minutes. It is preferred that a structure of crosslinked layer/uncrosslinked layer/crosslinked layer is formed in the thickness direction of the film. As the desirable label of the present invention, the film is preferable the crosslinked layer of which has a gel fraction of 20 to 70% by weight, the uncrosslinked layer of which has a gel fraction of 0% by weight, which has a ratio of the uncrosslinked layer: both the crosslinked layers of 1:0.1 to 10, and which is biaxially stretched at a draw ratio of greater than 3 times in one direction and at an area magnification of greater than 9 times.

The gel fraction is defined by the quantity of insoluble matters which are left undissolved when a sample is extracted with boiling p-xylene.

The thickness of the BOPE film 3 used is usually about 10 to 100 microns.

For the above-described BOPE film 3, though some of the methods for preparing it have been described above, the matters disclosed in Japanese Patent Unexamined Publication Nos. 59-174322/1984 and 61-74819/1986 may also be applied.

Printing can be performed on the BOPE film 3, for example, by gravure printing, offset printing, flexographic printing and silk screen printing. It is preferred that the BOPE film 3 is preliminarily treated with corona discharge before printing. As the printing ink, urethane ink is preferably used.

Adhesives constituting the adhesive layer 5 include various adhesives such as low density polyethylene (LDPE), linear low density polyethylene (LLDPE), ethylene-vinyl acetate copolymers (EVA), ethylene-ethylacrylate copolymers (EEA), other ethylenic copolymers or modified copolymers thereof, acrylic adhesives and urethane adhesives. It is particularly preferred to use an adhesive which can be heat bonded to a bottle in a mold when the bottle is formed by blow molding.

Then, methods for forming the adhesive layer 5 having the uneven surface 50 on the back printed surface 4 of the BOPE film 3 are described.

The surface of the coated adhesive layer 5 of LDPE, etc. is embossed using an embossing roll after extrusion coating, or when the adhesive layer is formed by extrusion coating, the adhesive is extruded on the chilling roll having a specified pattern to form the uneven surface 50. The uneven surface 50 formed on the adhesive (sealant) layer 5 makes degassing possible, whereby the blister phenomenon can be canceled.

The pattern of the uneven surface 50 may be any as long as the blister phenomenon is avoided. For example, the hexagonal pattern is used.

In the present invention, the latter method is preferable to keep the surface of the label smoother.

Then, methods for forming the adhesive layer 5 having the uneven surface 50 by transferring the adhesive to the back printed surface 4 of the BOPE film 3 by dot coating are described.

The surface of the rotating dot roll is divided by grooves to form triangular, quadrilateral or hexagonal patterns, and lacquer is applied to the surface of the roll. Then, the label is brought into contact with the surface of the rotating dot roll to apply the lacquer to the surface of the label in uneven form. Namely, for example, grooves having a depth of 120 μm are formed on the surface of the dot roll in a groove number of 55 grooves per inch in width to form triangular, quadrilateral or hexagonal pyramids. On the other hand, solid lacquer is dissolved in an organic solvent such as ethyl acetate, toluene, methyl ethyl ketone (MEK) or an alcoholic solvent. The resulting solution is adjusted to a viscosity of about 50 centipoise stokes at 50° C., and applied to the surface of the roll. Then, the polyethylene label is brought into contact with the surface of the roll while rotating the roll to transfer the solution to the label, whereby uneven coating is performed on the label.

Another embodiment of the label 2 of the present invention is illustrated according to FIG. 1B.

Referring to FIG. 1B, the reference numeral 3 designates a BOPE film in which the degree of crosslinking inwardly decreases across the thickness of the film, the reference numeral 4 designates a printed layer formed on one side (back surface) of the BOPE film, the reference numeral 5 designates an adhesive layer, and the reference numeral 6 designates a primer layer formed between the printed layer 4 and the adhesive layer 5. The reference numeral 7 designates a label surface protective layer (scratch coat layer) for protecting the surface of the label so that the surface of the label is not stretched, and formed of, for example, nitrocellulose lacquer.

As the BOPE film 3 and the printed layer 4, a film and a layer similar to those described above may be used, and they can be formed similarly with the above.

The primer 6 is applied to the printed surface of the BOPE film on which the back printed layer 4 is formed.

As the primer 6, a primer comprising chlorinated polypropylene (Cl-PP) in combination with an ethylene-vinyl acetate copolymer (EVA) is preferably used.

Adhesives constituting the adhesive layer 5 formed on the side of the primer 6 include various adhesives such as ethylene-vinyl acetate copolymers or modified copolymers thereof, acrylic adhesives and urethane adhesives. It is particularly preferred to use an adhesive which can be heat bonded to a bottle in a mold when the bottle is formed by blow molding.

Examples of methods for forming the adhesive layer 5 on the BOPE film 3 include a method of applying the adhesive to the primer layer 6 formed on the film 3 with a roll, etc. and a method of coating the primer layer 6 with the adhesive by extrusion.

The adhesive layer 5 used in the label of the present invention is usually formed to a thickness of about 5 to 20 μm in the case of the label as shown in FIG. 1B. When the adhesive layer is formed by extrusion coating, the adhesive is usually applied to a thickness of about 5 to 20 μm. When the adhesive layer is formed by dot coating, the adhesive is usually applied to a thickness of about 3 to 20 μm.

The thickness of the label 2 is suitably selectable depending on the use, but generally in the range of about 50 to 130 μm.

The label 2 obtained as described above can be stuck on the surface of the bottle in the mold concurrently with blow molding of the bottle.

Figure 3:
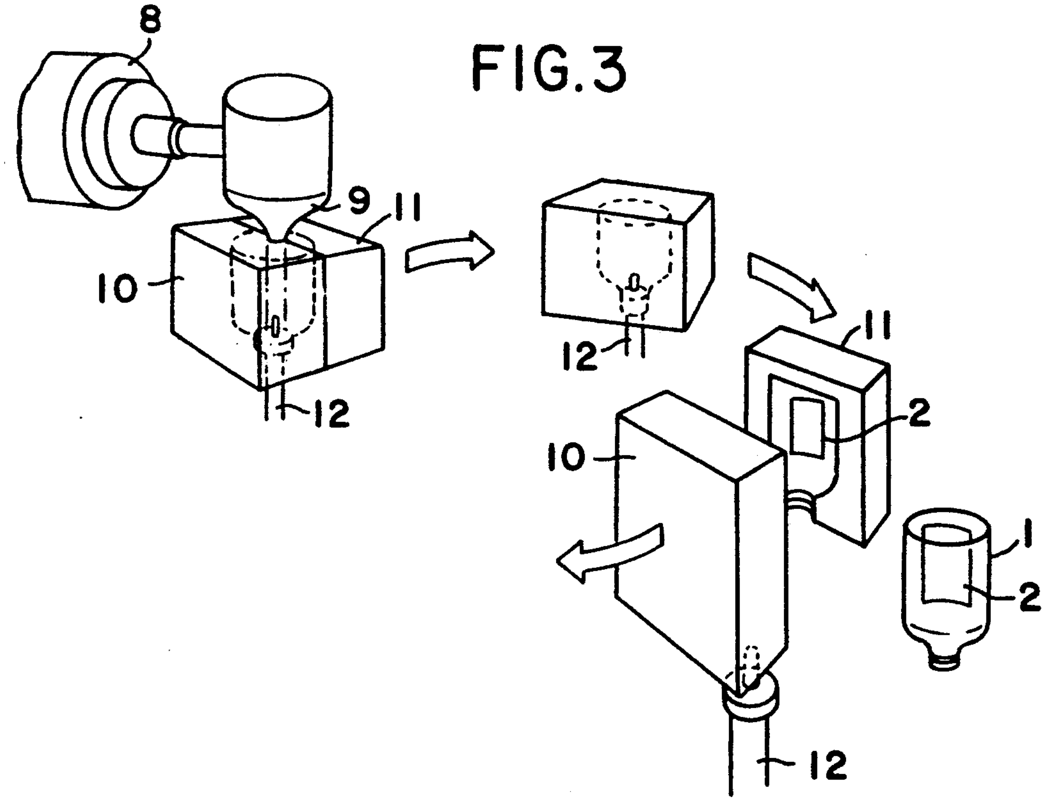
FIG. 3 is a perspective view illustrating blow molding steps using a label for in-molding of the present invention.

An example of the blow molding will hereinafter be illustrated according to FIG. 3.

In blow molding, a polyethylene parison which is cylindrical in a softened state is formed by extruding polyethylene from a parison die 9 through an extruder 8, and then mold parts 10 and 11 are closed. Air is blown into the parison from a blow pin (air blowing member) 12 to expand the parison along an inner configuration of the mold parts 10 and 11. After cooling, the mold parts 10 and 11 are opened and the bottle 1 is taken out. When the air is blown into the parison to expand it, the label 2 is previously set in either of the mold parts 10 and 11. In the embodiment shown in this drawing, the label 2 has been stuck is taken out, followed by setting another label 2 in the mold part 11, and thus these procedures are circulated.

The case that the printed surface is coated with the sealant has been described above. In the present invention, however, the adhesive layer may be formed on the back surface on which printing is not performed (although printing is performed on the front surface), by extrusion coating, or the adhesive layer may be formed by bringing the back surface of the film on which printing is not performed (although printing is performed on the front surface) into contact with the rotating dot roll carrying the adhesive to transfer the adhesive to the back surface by dot coating.

The present invention will be described in accordance with the following examples (illustrative examples).

EXAMPLE 1

A stock sheet (gel fraction (%): crosslinked outer layer/uncrosslinked inner layer/crosslinked outer layer=50/0/50, ratio of respective layers in thickness: crosslinked outer layer/uncrosslinked inner layer/-crosslinked outer layer =1:1.75:1, thickness: 500 μm) formed of high density polyethylene (density: 0.957 g/cm$^3$, MI: 1.0 g/10 minutes) and crosslinked by irradiation of electron beams was stretched 4×6 times at 127° C. to form a biaxially oriented film (hereinafter referred to as a BOHD film) having a thickness of 20 μm. The film thus obtained had a haze value of 2.7% and a water vapor transmission rate of 3.6 g/m$^2$/24 hours.

Then, this BOHD film was treated with corona discharge, followed by four-color gravure printing on the treated surface, using ink of the urethane family.

LDPE was applied to the printed surface of this BOHD film by extrusion coating.

The surface of the coated LDPE layer was embossed using an embossing roll to form an uneven surface for degassing after extrusion coating.

Alternatively, when the LDPE layer was formed by extrusion coating, LDPE was extruded on a chilling roll having a pattern (manufactured by NACHI-Fujikoshi Corp.) to give a hexagonal embossed pattern for degassing to the coated LDPE layer.

Then, the resulting film was cut to an elliptical form with a major axis 100 mm long and a minor axis 60 mm wide to form a label. The label thus obtained was set in a mold for blow molding. High density polyethylene was formed into a 200 ml bottle by blow molding, and the label was concurrently stuck on the surface of the bottle as a label for in-molding.

The label stuck on the bottle thus obtained had clear back surface print and an integral feeling as if curved-surface printing had been performed on the bottle itself. Water or stains could be easily swabbed from the label, and the contamination and the breakage of the label were avoided.

Further, blisters were observed according to the 130° F. oven test. As a result, the blister phenomenon was not observed. The peel-off strength of the label from the bottle showed 430 g/15 mm at 73° F., 390 g/15 mm at 122° F. and 80 g/15 mm at 140° F. These results revealed that the label was sufficiently stuck on the bottle.

EXAMPLE 2

A stock sheet (gel fraction (%): crosslinked outer layer/uncrosslinked inner layer/crosslinked outer layer=50/0/50, ratio of respective layers in thickness: crosslinked outer layer/uncrosslinked inner layer/-crosslinked outer layer =1:1.75:1, thickness: 750 μm) formed of high density polyethylene (density: 0.957 g/cm$^3$, MI: 1.0 g/10 minutes) and crosslinked by irradiation of electron beams was stretched 3×5 times at 127° C. to form a BOHD film having a thickness of 50 μm. The film thus obtained had a haze value of 2.7% and a water vapor transmission rate of 3.6 g/m$^2$/24 hours.

Then, this BOHD film was treated with corona discharge, followed by four-color gravure printing on the treated surface, using ink of the urethane family.

EVA lacquer (lacquer 33W1790 manufactured by Toyo Morton Ltd.) was applied to the printed surface of this BOHD film in an amount of 5 g/m$^2$ by dot coating. Grooves having a depth of 120 μm were formed on the surface of a roll used for dot coating in a groove number of 55 grooves per inch in width to form triangular pyramids. Then, after drying, the resulting film was cut to a form with 100 mm long and 60 mm wide to form a label. The label thus obtained was set in a mold for blow molding. High density polyethylene was formed into a 500 ml bottle by blow molding, and the label was concurrently stuck on the surface of the bottle as a label for in-molding.

The label stuck on the bottle thus obtained had clear back surface print and an integral feeling as if curved-surface printing had been performed on the bottle itself. Water or stains could be easily swabbed from the label, and the contamination and the breakage of the label were avoided. The blister phenomenon was not observed.

Further, blisters were observed according to the 54° C. oven test. As a result, the blister phenomenon was not observed, which revealed that the label was sufficiently stuck on the bottle.

EXAMPLE 3

A stock sheet (gel fraction (%): crosslinked outer layer/uncrosslinked inner layer/crosslinked outer layer=50/0/50, ratio of respective layers in thickness: crosslinked outer layer/uncrosslinked inner layer/-crosslinked outer layer =1:1.75:1, thickness: 750 μm) formed of high density polyethylene (density: 0.957 g/cm$^3$, MI: 1.0 g/10 minutes) and crosslinked by irradiation of electron beams was stretched 3×5 times at 127° C. to form a BOHD film having a thickness of 50 μm. The film thus obtained had a haze value of 2.7% and a water vapor transmission rate of 3.6 g/m$^2$/24 hours.

Then, this BOHD film was treated with corona discharge, followed by four-color gravure printing on the treated surface, using ink of the urethane family.

The printed surface of this BOHD film was coated with a primer having the following composition:

| | |
|---|---|
| Vehicle | |
| Chlorinated polypropylene (Cl-PP) | 18% by weight |
| EVA | |
| Ether resin | |
| Solvent | |
| Toluene | 59% |
| MEK | 11.5% |
| Ether acetone | 6.5% |
| Isopropyl alcohol | 3.0% |
| Others | 2.0% |

Then, an adhesive layer was formed as with Example 1 to obtain a label. This label was used as a label for in-molding.

The intervention of the primer increased the adhesive strength, compared to the case that the adhesive layer was directly formed on the printed surface.

EXAMPLE 4

A stock sheet (gel fraction (%): crosslinked outer layer/uncrosslinked inner layer/crosslinked outer layer=50/0/50, ratio of respective layers in thickness: crosslinked outer layer/uncrosslinked inner layer/-crosslinked outer layer =1:1.75:1, thickness: 750 μm) formed of high density polyethylene (density: 0.957 g/cm$^3$, MI: 1.0 g/10 minutes) and crosslinked by irradiation of electron beams was stretched 3×5 times at 127° C. to form a BOHD film having a thickness of 50 μm. The film thus obtained had a haze value of 2.7% and a water vapor transmission rate of 3.6 g/m$^2$/24 hours.

Then, this BOHD film was treated with corona discharge, followed by four-color gravure printing on the treated surface, using ink of the urethane family.

The printed surface of this BOHD film was coated with a primer having the following composition:

| | |
|---|---|
| Vehicle | |
| Cl-PP | 18% by weight |
| EVA | |
| Ether resin | |
| Solvent | |
| Toluene | 59% |
| MEK | 11.5% |
| Ether acetone | 6.5% |
| Isopropyl alcohol | 3.0% |
| Others | 2.0% |

Then, an EVA lacquer adhesive was applied to the surface of this primer layer in an amount of 5 g/m$^2$. After drying, the resulting film was cut to a form with 100 mm long and 60 mm wide to form a label. The label thus obtained was set in a mold for blow molding. High density polyethylene was formed into a 500 ml bottle by blow molding, and the label was concurrently stuck on the surface of the bottle as a label for in-molding.

The label stuck on the bottle thus obtained had clear back surface print and an integral feeling as if curved-surface printing had been performed on the bottle itself. Water or stains could be easily swabbed from the label, and the contamination and the breakage of the label were avoided.

The intervention of the primer increased the adhesive strength, compared to the case that the adhesive layer was directly formed on the printed surface. Namely, when the adhesive layer was directly formed on the printed surface, the peel-off strength of the label from the bottle was 170 g/15 mm. In contrast, when the primer layer intervened between the printed surface and the adhesive layer, the peel-off strength was raised to 1010 g/15 mm.

INDUSTRIAL APPLICABILITY

Due to the properties described above, the labels of the present invention can be used as labels for various uses, and are particularly suitable for in-molding applications as described in the following examples.

The polyethylene labels of the present invention can be used not only in blow molding, but also in other molding methods such as injection molding.

We claim:

1. A polyethylene label have good clarity, rigidity, strength, and resistance to water wetting and contamination comprising:

a polyethylene film having a thickness and a first side surface and a second side surface wherein cross-linking decreases in degree inwardly across the thickness from both said first and second side surface;

printing present on one side surface of said film;

an adhesive layer present on the side surface having said present or on the opposite non-printed side surface;

said adhesive layer having a thickness of about 3 to 30 μm, said adhesive layer having an uneven surface, said unevenness being sufficient to prevent blister phenomenon.

2. A polyethylene label as claimed in claim 1, in which said uneven surface has an embossed pattern.

3. A polyethylene label as claimed in claim 1, in which said uneven surface has a dot coating pattern.

4. A polyethylene label as claimed in claim 1, 2 or 3, in which a primer layer is further formed between the printed surface and the adhesive layer.

* * * * *

UNITED STATES PATENT AND TRADEMARK OFFICE
CERTIFICATE OF CORRECTION

PATENT NO. : 5,227,233
DATED : July 13, 1993
INVENTOR(S) : Y, ITABA et al.

It is certified that error appears in the above-identified patent and that said Letters Patent is hereby corrected as shown below:

Col. 10, line 23, claim 1, prior to "present" insert --printing--

Signed and Sealed this

Twenty-second Day of March, 1994

Attest:

Bruce Lehman

BRUCE LEHMAN

*Attesting Officer*

*Commissioner of Patents and Trademarks*